United States Patent
Wishoff et al.

(10) Patent No.: US 6,300,962 B1
(45) Date of Patent: Oct. 9, 2001

(54) METHOD AND APPARATUS FOR PROVIDING RELIABLE GRAPHIC MEMORY OPERATIONS IN A SET-TOP BOX ENVIRONMENT

(75) Inventors: Clayton W. Wishoff, Foster City; Morgan Woodson; Bill J. Aspromonte, both of Santa Cruz, all of CA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/220,305

(22) Filed: Dec. 23, 1998

(51) Int. Cl.⁷ .................................................. G06F 15/167
(52) U.S. Cl. ........................... 345/543; 345/547; 348/563
(58) Field of Search ................................... 345/501, 507, 345/509, 512, 531, 543, 547; 348/563; 709/1, 100, 102–104, 108, 318

(56) References Cited

U.S. PATENT DOCUMENTS

| | | | |
|---|---|---|---|
| 5,905,522 | * 5/1999 | Lawler | 725/131 |
| 5,968,167 | * 10/1999 | Whitaker et al. | 712/225 |
| 6,081,665 | * 6/2000 | Nilsen et al. | 717/5 |
| 6,105,119 | * 8/2000 | Kerr et al. | 711/219 |
| 6,148,389 | * 11/2000 | So | 712/35 |

FOREIGN PATENT DOCUMENTS

| | | |
|---|---|---|
| 0772159 A | 5/1997 | (EP) . |
| WO 99/18730 | 4/1999 | (WO) . |

OTHER PUBLICATIONS

C. Vogt, "Speicherorganisation in object–orientierten Systemen—eine Übersicht," *Informationstechnik, IT*, vol. 33, No. 4, Aug. 1, 1991.

* cited by examiner

*Primary Examiner*—Ulka J. Chauhan
(74) *Attorney, Agent, or Firm*—Kenneth M. Massaroni; Kelly A. Gardner; Hubert J. Barnhardt, III

(57) ABSTRACT

A video memory handling system and method for providing a graphic computer-implemented process with a predetermined amount of video memory to be used by the graphic process to perform a predetermined graphic-related operation within a set-top box environment. A first video memory portion is provided which has an allocation status with respect to the graphic process. A video memory handling data structure indicates the allocation status of the first video memory portion. A video memory manager which is connected to the video memory handling data structure reallocates the first video memory portion based upon the video memory handling data structure. The reallocated first video memory portion is utilized by the graphic process to perform the predetermined graphic-related operation.

25 Claims, 11 Drawing Sheets

```
typedef struct Mem_InternalHandleStruct                    ─── 106
{
    unsigned              id              : 16;    // ==kMem_HandleID
    Int                   lockCount       : 8;     // number of locks currently held
    unsigned              purgePriority   : 4;     //
    unsigned              purgeable       : 1;     // == 1 if the handle is purgeable
    unsigned              sharable        : 1;     // ==1 if the handle is sharable
    unsigned              onPurgeableList : 1;     // ==1 if the handle is on the purgeable list
    unsigned              deleteUserData  : 1;     // ==1 if I'm suppose to delete the user data
    Mem_InternalHeap      heap;                    // the heap the handle's data came from
    i32                   size;                    // size of the handle's data
    Mem_InternalChunk     chunk                    // the handle's data
    Mem_InternalHandle    purgeableList;           // list of handles that can be purged
    Mem_HandleCallback    *cbFunc;                 // callback function ptr for this handle
    void                  *userData;               // arbitrary user data for the handle
}
Mem_InternalHandleStruct;
```

FIG. 5a

```
typedef struct Mem_InternalHeapStruct
{
    unsigned        id              : 16;  // ==kMem_HeapID; used to validate heap structure
    unsigned        alignLog2       : 4;   // log(base2) of alignment size of allocations in heap
    unsigned        coaleace        : 1;   // ==1 if the heap coalesces adj+acent tree memory blocks
    unsigned        autoCompact     : 1;   // ==1, if the heap does a compaction if an allocation fails
    unsigned        a_gorlthr       : 1;   // other xMem_FirstFit or kMem_BestFit
    i32             origSize;              // size of the heap (including overhead) before alignment
    i32             size;                  // size of the heap (including overhead) after alignment
    i32             origBlockSize;         // block size set by caller (can be different than heap >blocksize)
    i32             blockSize;             // default size of sub-blocks allocated within heap
    i16             fixSizedCount;         // # of items to put in a fixed-size block
    i16             fixSizedSize;          // size of items to put in a fixed-size block
    u18             *brk;                  // high water mark of memory used within heap
    Mem_InternalHeap fNext;                // linked list of all heaps
}
Mem_InternalHeapStruct;
```

FIG. 5b

```
typedef struct Mem_InternalChunkStruc:
{
    unsigned        id          :16;      // ==kMem_PtrChunkID or kMem_HandleChunkID or kMem_HndDataChunkID
    unsigned        sizeAdj     :10;      // difference between size of chuck and user requested size
    unsigned        free        :1;       // --1 of the chunk is free
    i32             size;                 // size of chunk (including overhead)
    union {
        Mem_InternalChunk   chunk;        // if chunk is free, ptr to next free chunk
        Mem_InternalBlock   block;        // if chunk is used, ptr so block the chunk came from
    } link;
# if kMem_EnablePtrDescriptions
    char            *description;
#endif
}
Mem_InternalChunkStruct;
```

FIG. 5c

```
typedef struct Mem_InternalBlockStruct
{
    unsigned            id           : 16;   // ==kMem_BlockID
    unsigned            fixSized     : 1;    // ==1 of the block does fixsized allocations
    Mem_InternalHeap    heap;                // heap the block belongs to
    i32                 size;                // size of the block (including overhead)
    Mem_AppID           owner;               // owner (i.e. appID) of the block
    Mem_InternalChunk   freeList;            // head of list of free chunks within the block
    Mem_InternalHandle  purgeableList;       // head of list of purgeable handles within the block
}
```

FIG. 5d

METHOD AND APPARATUS FOR PROVIDING RELIABLE GRAPHIC MEMORY OPERATIONS IN A SET-TOP BOX ENVIRONMENT

BACKGROUND AND SUMMARY OF THE INVENTION

The present invention relates generally to computer video memory management and more particularly to computer video memory management in a set-top box television environment.

Graphic applications require a certain amount of graphic/video memory in order to smoothly perform their graphic routines. However, video memory is at a premium within the set-top box television environment. For example, a set-top box may have approximately two megabytes of video memory. MPEG (Moving Pictures Experts Group) components in some situations consume 1812 kilobytes, leaving only 236 kilobytes for graphic applications. Certain high resolution graphic applications utilize 600 kilobytes for sixteen bits per pixel or 300 kilobytes for eight bits per pixel. Accordingly, the disadvantage ensues that graphic applications quickly run out of memory to smoothly perform their operations.

The present invention is directed to overcoming this disadvantage and other disadvantages. In accordance with the teachings of the present invention, a video memory handling system provides a graphic computer-implemented process with a predetermined amount of video memory to be used by the graphic process to perform a predetermined graphic-related operation within a set-top box environment. A first video memory portion is provided which has an allocation status with respect to the graphic process. A video memory handling data structure indicates the allocation status of the first video memory portion. A video memory manager which is connected to the video memory handling data structure reallocates the first video memory portion based upon the video memory handling data structure. The reallocated first video memory portion is utilized by the graphic process to perform the predetermined graphic-related operation.

Advantages of the novel handle-based system of the present invention include handles of video memory portions being lockable, movable, purgeable, and having priorities. These characteristics are useful, for example, in implementing a garbage collection scheme that allows re-allocating the memory of non-locked, purgeable, low priority handles as well as the memory associated with those handles which have been least recently used.

BRIEF DESCRIPTION OF THE DRAWINGS

Additional advantages and features of the present invention will become apparent from subsequent description and the appended claims, taken in conjunction with the accompanying drawings wherein the same reference numeral indicates the same parts:

FIGS. 5a–5d are exemplary data structure implementations of the data structure diagram of FIG. 4;

DESCRIPTION OF THE PREFERRED EMBODIMENT

Figure 1:
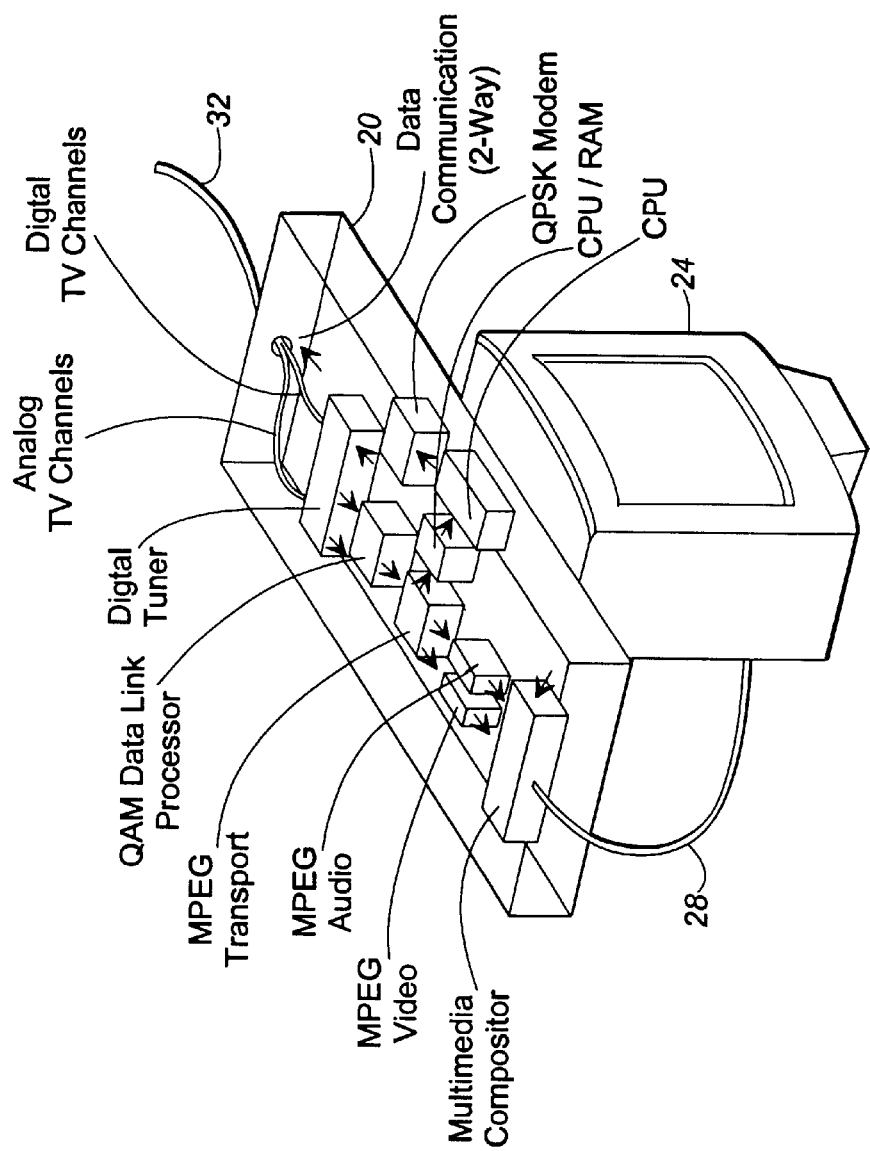
FIG. 1 is a perspective view of a set-top box system.

FIG. 1 shows an exemplary set-top box 20 connected to television 24 via cable 28. Cable 32 provides set-top box 20 with a broadcast analog, broadcast digital, and interactive digital transmission. Set-top box 20 contains application and operating system software in order to provide an advanced interactive television environment. The operating system is utilized by set-top box 20 to, for example, provide interfaces between the application software and the various devices used by the set-top box 20.

Figure 2:
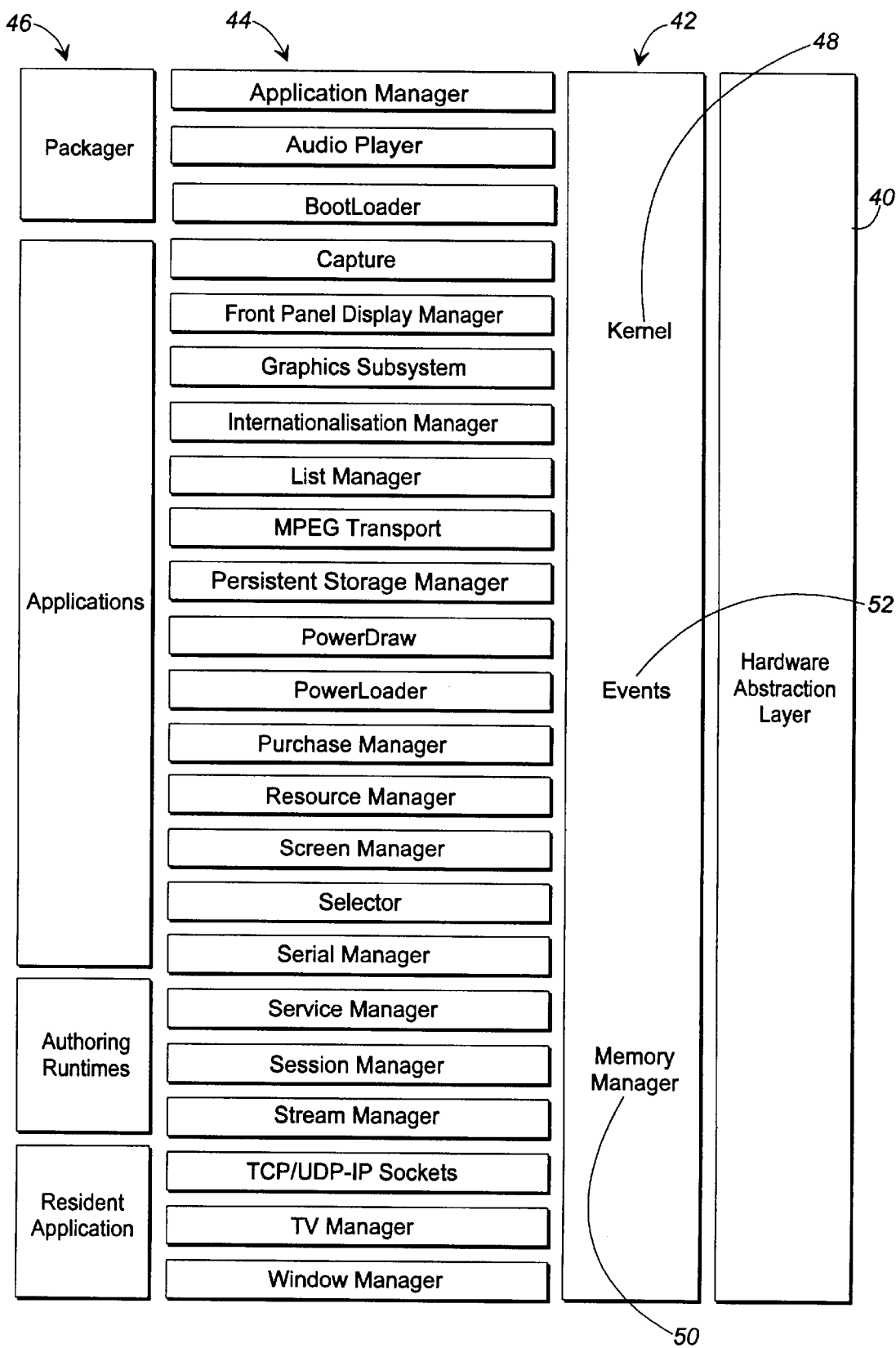
FIG. 2 is a block diagram depicting the various exemplary programs operating within the set-top box system of FIG. 1.

FIG. 2 depicts the software components of a set-top box. The multitasking operating system of the set-top box addresses the high-performance demands of media-centric, real-time applications being delivered through a set-top box. The operating system provides an open, scalable platform for developing and delivering multimedia content to consumers across broadcast and client/server networks. The software architecture for the operating system includes layers of interconnected modules designed to minimize redundancy and optimize multimedia processing in an interactive, network setting. The layers of the architecture include a hardware abstraction layer 40, a core layer 42, an application support layer 44 and an application layer 46.

Each hardware device associated with the multimedia client is abstracted into a software device module that resides in the hardware abstraction layer 40. Each of these device modules are responsible for media delivery and manipulation between a hardware device and the remainder of the operating system. Application program interfaces (APIs) supported by each device module separate the hardware dependencies of each device from the portable operating system facilities, and thereby mask the idiosyncrasies of different hardware implementations.

A kernel 48 and memory manager 50 residing in the core layer 42 provide the base functionality needed to support an application. A fully preemptive, multithreaded, multitasking kernel is designed to optimize both set-top memory footprint and processing speed. Since the operating system resides on consumer units, it has been designed to exist in a ROM-based system with a very small footprint (e.g., 1 megabyte). In addition, the kernel has also been created to take advantage of 32-bit Reduced Instruction Set Computer (RISC) processors which enable high-speed transmission, manipulation and display of complex media types.

Memory manager 50 provides an efficient allocation scheme to enable the best performance from limited memory resources. Memory manager 50 provides an efficient memory allocation scheme, enabling optimal performance from limited set-top memory resources. Memory manager 50 prevents applications from running out of memory by enabling the sharing of relocateable, purgeable memory. Memory manager 50 is provided to manage the allocation and purging of video memory used by such graphic applications as a line drawing graphic application included within application support layer 44. Within the present invention, it should be understood that the terms graphic and video are used interchangeably.

The core layer 42 provides an integrated event system 52 and a standard set of ANSI C utility functions. Built on top of the core layer 42 is an application support layer 44. This set of support modules provides higher-level processing functions and application services. Application management, session management, and tuner management are a few examples of these services. At the highest application level 46, at least one application, referred to as a resident application is usually always executing on a set-top box. The application level 46 also provides the necessary capabilities for authoring applications and for managing resources (e.g., the tuner) between the resident application and other background applications residing on the set-top box.

Figure 3:
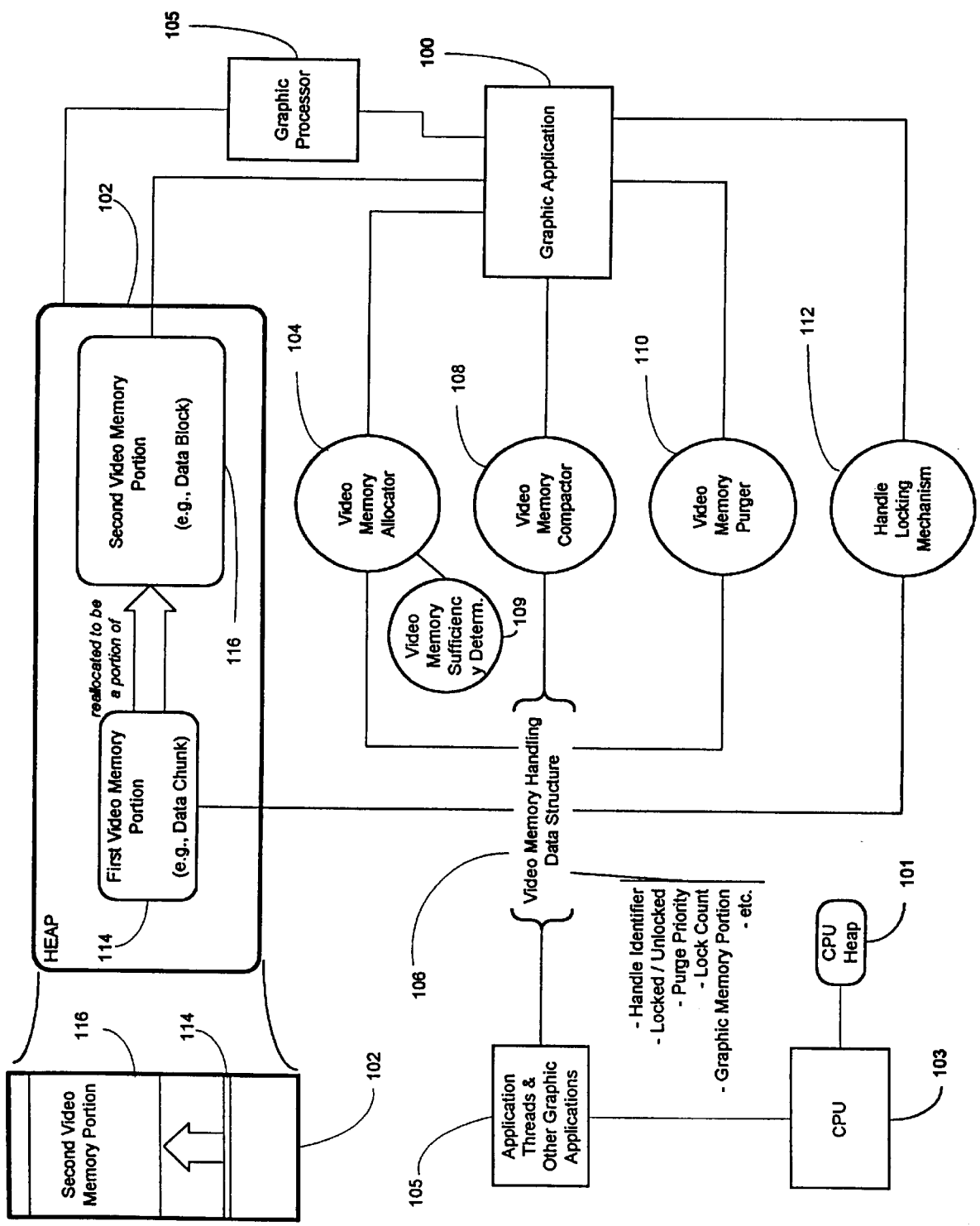
FIG. 3 is a block diagram depicting the components of the present invention for allocating video memory via handles.

FIG. 3 depicts a graphic application 100 requiring a certain amount of video memory from heap 102 in order to perform a graphic operation. Graphic application 100 operates within the context of a two heap system: a first heap 101 for use by the central processing unit 103; and a second heap 102 for use by graphic application 100 and graphic processor 105. The preferred embodiment of the present invention is used within a system which has two frame buffers. One frame buffer is what is actually visible and other frame buffer is where graphical operations are proposed (e.g., drawing text and lines wherein it is desirable not to let the user see these operations). Also, the preferred embodiment includes graphic memory 102 which is not connected to the CPU 103 but to graphic processor 105.

Graphic application 100 allocates memory by invoking video memory allocator 104. Graphic application 100 specifies the heap from which to allocate the memory as well as the size of the memory needed. Video memory allocator 104 returns a handle to the newly allocated memory. Video memory allocator 104 also initializes the memory to zeros. Handles are also sharable among application threads and between applications as shown by block 105. Handles allow memory portions to be rearranged and resized.

Video memory allocator 104 provides the following information to a graphic application: the heap from which memory associated with the specified handle was allocated; the size of the memory associated with a specified handle; and whether a specified handle is valid.

Video memory allocation also provides heap integrity verification. Free memory is preferably filled with a pattern. As one of the memory management tasks it performs when verifying a heap's integrity, memory manager checks that the pattern in free memory has not been altered. Unlike a heap, whose overhead is allocated from the heap itself, the overhead associated with a handle is allocated in addition to the memory specified by video memory allocator 104.

Video memory allocator 104 utilizes a novel video memory handling data structure 106 in order to associate handles with portions of video memory. Video memory handling data structure 106 provides the mechanism by which the video manager 50 can rearrange memory portions (which are also known in the art as "data chunks") in order to provide to graphic application 100 the amount of memory it needs.

In the preferred embodiment, video memory compactor 108 reallocates (shifts/compacts) via handles video memory portions in order to satisfy a request for a certain amount of video memory. For example, video memory compactor 108 can shift first memory portion 114 via its handle so that first video memory portion 114 is reallocated with respect to second video memory 116. Such a reallocation may constitute sufficient video memory to satisfy the memory requirement of graphic application 100. Because compaction takes time, a heap does not preferably automatically compact itself by default. In an alternative embodiment, video memory compactor 108 can shift first memory portion 114 via its handle so that first video memory portion 114 is reallocated to be contiguous with second video memory 116.

Applications move data from one heap video memory portion to another by invoking video memory compactor 108. The memory handle itself does not move; only the data associated with the handle moves. Moreover, an application can resize a memory portion associated with a specified handle.

If after compaction a sufficient amount of memory is still not available as determined by video memory sufficiency determinator 109, then the present invention uses video memory purger 110 and video memory handling data structure 106 to purge handles beginning with the handles with lower priority numbers. The memory associated with a handle cannot be purged in the preferred embodiment if the handle is locked.

Before using a purgeable handle, it is preferable to verify that it still exists. An application sets a handle as purgeable by indicating as such to video memory purger 110 which then updates video memory handling data structure 106 accordingly.

A handle's purge priority defines the importance of the handle's memory relative to all allocated memory. In the preferred embodiment, priority ranges from zero to fifteen, inclusive, with the default purge priority of a handle set to four. The lower a handle's purge priority, the more likely it is that the memory associated with the handle will be purged.

The preferred embodiment of the present invention allows a handle's default priority to be modified by a graphic application. Also, applications can explicitly purge memory by passing the handle to the memory to be purged and obtaining in return from video memory purger 110 a boolean that indicates the function's success or failure.

A handle locking mechanism 112 is provided to manage the locking and unlocking of a handle and to maintain a running lock count. To ensure that memory is not moved, purged, or accessed while a graphic application is using it, handle locking mechanism 112 provides applications with the ability to lock the handle associated with the memory. A graphic application locks a handle by passing the handle to be locked to handle locking mechanism 112. Preferably, the graphic application unlocks the handle upon completion of the operation.

Nested locks occur when more than one application, or application thread, utilizes handle locking mechanism 112 with the same handle. Handle locking mechanism 112 maintains a lock count for this situation, the value of which can be retrieved by graphic applications from handle locking mechanism 112. The handle lock count represents the number of locking function calls that have been made on the specified handle. For each function call to handle locking mechanism 112 to unlock the handle, the lock count is decremented by one.

Video memory allocator 104 also provides for deleting a handle. Deletion of a handle is different from purging a handle. Whereas purging a handle deletes only the data to which the handle refers, deleting a handle deletes both the data to which the handle refers as well as the handle itself.

Also, unlike a purged handle, once a handle is deleted, it cannot be used anymore. An application that references a deleted handle will cause memory manager 50 to produce an exception. Preferably, applications delete handles of all sizes, even 0 (zero), when they are no longer needed.

Figure 4:
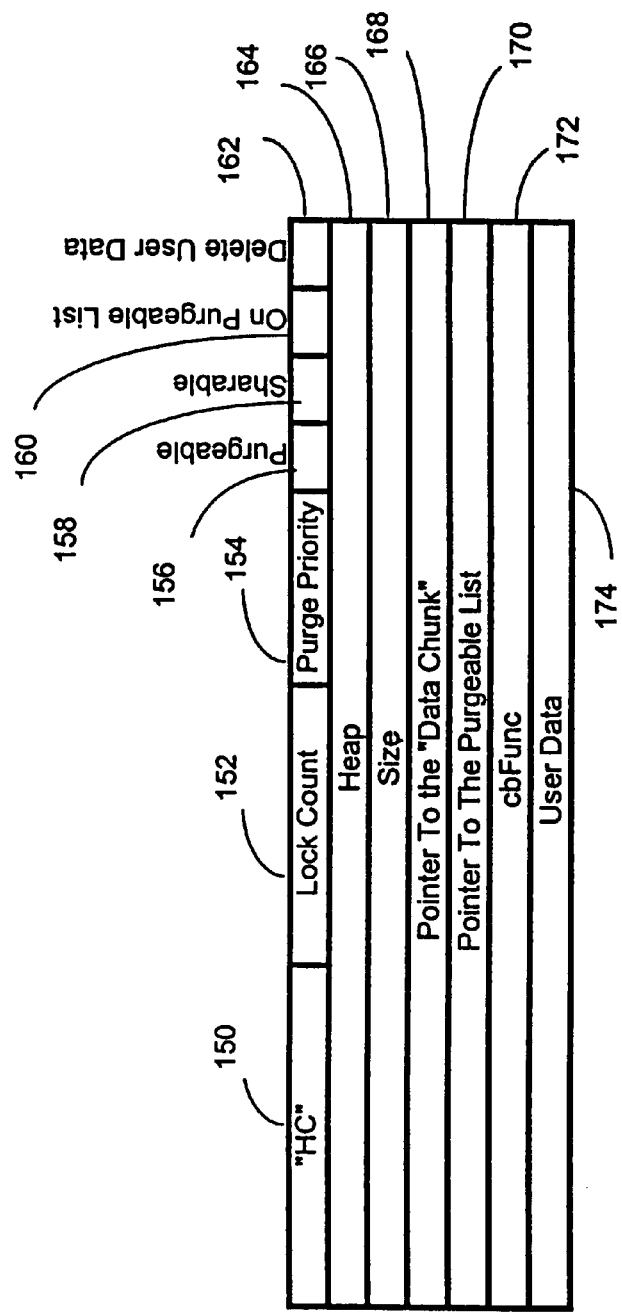
FIG. 4 is a data structure diagram depicting the preferred embodiment for the video memory handling data structure.

FIG. 4 depicts the preferred embodiment for the novel video memory handling data structure 106 which is used to keep track of allocations to heap video memory. Video memory handling data structure 106 includes an identification data field 150. Preferably, identification data field 150 is sixteen bits in length and is formatted as two ASCII characters so that a heap can be examined and determined at a glance what kind of data chunks exist: "HC" for handle chunk; "DC" for data chunk; or "PC" for pointer chunk.

Lock count field 152 stores the count for how many times a handle has been locked. When the count is zero, the handle is unlocked and the data chunk portion can be moved around to accommodate other allocations. The lock count is preferably an integer which allows the handle to be locked multiple times as long as the computer-implemented processes which lock it also unlock it when the processes are done.

With respect to purge priority field 154, if the memory manager runs out of memory during an allocation, it purges purgeable handles by order of the priority stored in purge priority field 154. This approach allows the memory manager to choose whether the data in a handle is easy to recreate, but convenient to have around if there is plenty of memory (low priority) or difficult to recreate, but purgeable if an urgent need exists for memory as in the situation when a user has tuned an MPEG digital video channel.

Purgeable field 156 indicates whether the handle is purgeable (i.e., a handle is purgeable if the handle is not locked). Sharable field 158 indicates whether the handle is sharable among computer processes.

With respect to the on purgeable list field 160, when a handle which is marked purgeable is unlocked for the first time (i.e., the lock count goes from one to zero), the handle is placed on the purgeable list so when an allocation is failing, the memory manager can quickly determine what data chunks are candidates for purging. If a handle is already unlocked, and "unlock" is called again, this flag prevents memory manager from having to check the purgeable list to see if the handle is already on it. With respect to locking a locked handle, this flag prevents memory manager from searching the list and trying to remove the handle from it again.

Heap field 164 is a reference back to the heap that contains the data chunk of the handle. Size field 166 is a size in bytes of the data chunk. This field is used to determine where the next data chunk starts and to determine if an open spot in memory is large enough to move this data chunk to when shifting memory portions around for heap compaction.

Pointer to the data chunk field 168 is the pointer to the actual data for which the handle is keeping track. Pointer to the purgeable list 170 is the list of handles which are marked purgeable and are unlocked. The cbfunc field 170 provides the call back function pointer for a handle. The user data field 172 is provided for arbitrary user data of the handle.

FIGS. 5a–5d depict an example of the preferred implementation of the video memory handling data structure 106 of FIG. 4.

Figure 6:
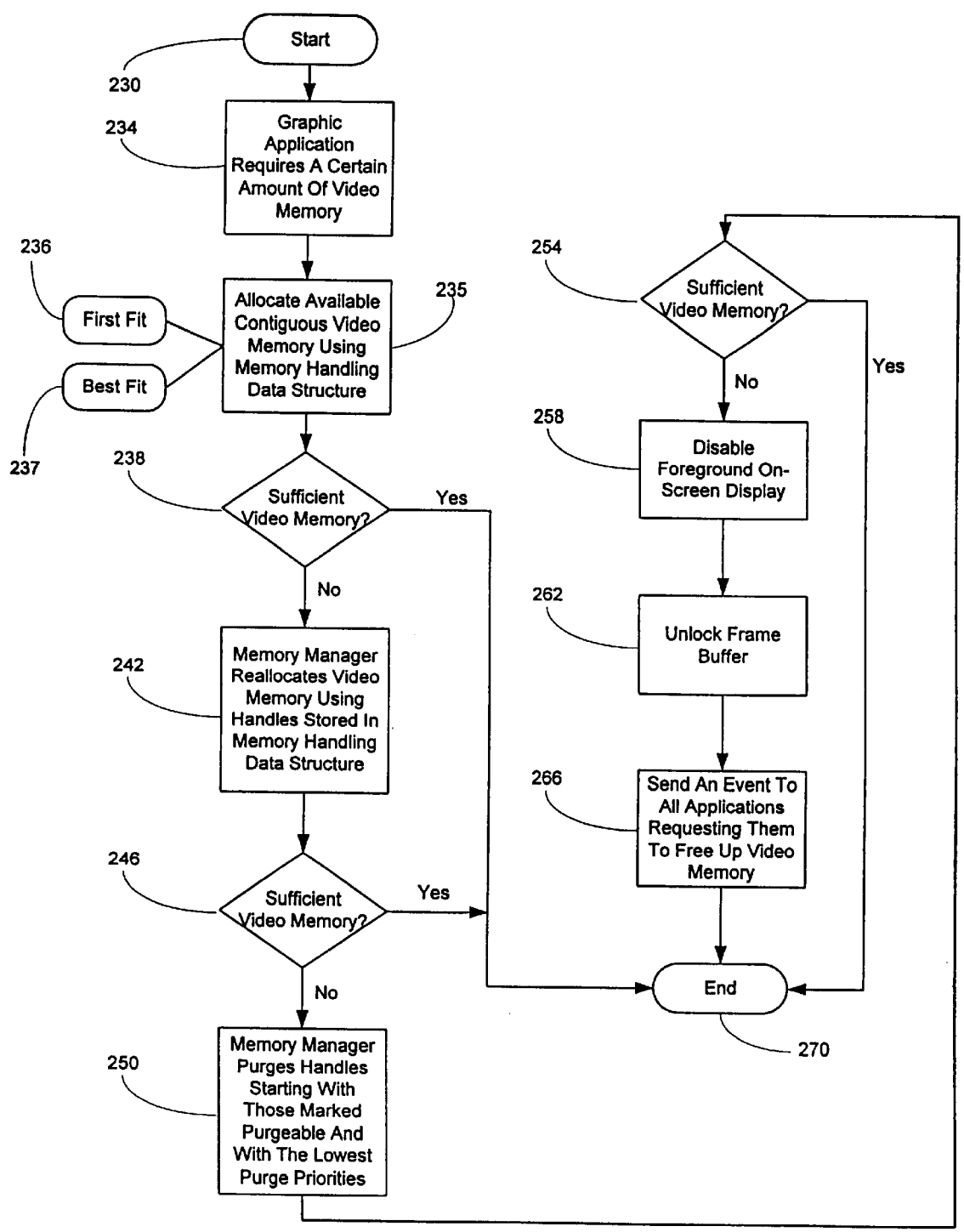
FIG. 6 is a flowchart depicting the process steps for allocating video memory via handles.

FIG. 6 depicts the process steps associated with video memory handling. Start indication block 230 indicates that process block 234 is to be executed. Process block 234 indicates that a graphic application requires a certain amount of graphic memory and requests the memory from the memory manager.

Since memory manager keeps track of both allocated and free memory via memory handling data structure, memory manager at process block 235 attempts to allocate available video memory (preferably, but not limited to, contiguous video memory) using the memory handling data structure. In the preferred embodiment, memory manager utilizes two memory allocation algorithms: first fit and best fit. By default, it uses the first fit algorithm.

For the first fit memory allocation scheme as indicated by process block 236, memory manager traverses its list of free memory and chooses the first piece of memory that satisfies the allocation request. The best fit memory allocation scheme as indicated by process block 237 involves the system traversing its entire list of free memory to find the piece of memory closest to the size of the allocation request. Once a heap exists, an application can choose which of these memory allocation algorithms it prefers the memory manager to use in managing that heap. This preferred approach provides for the use of different algorithms depending on an application's use of memory, the type of the set-top, the size of the set-top's memory, and the speed of the set-top's central processing unit (CPU).

Decision block 238 inquires whether sufficient video memory exists to handle the graphic applications request without "shifting" graphic memory portions via handles or without purging being required. If sufficient memory already exists, then processing terminates at end block 270. However, if there is not sufficient video memory, processing continues at process block 242.

At process block 242, memory manager reallocates video memory using handles stored in the novel memory handling data structure. The memory manager at decision block 246 then inquires whether sufficient video memory exists for handling the graphic applications video memory requests. If a sufficient amount does exist, then processing terminates at end block 270. If sufficient video memory does not exist, then processing continues at process block 250.

At process block 250, the memory manager purges handles starting with those marked purgeable and with the lowest purge priorities. If sufficient video memory is available as determined by decision block 254, then processing terminates at end block 270. However, if sufficient memory is not available even after the purging process, then process block 258 disables foreground on-screen display, and process block 262 unlocks the frame buffer. Process block 266 sends an event to all applications with a request to free up any video memory with which they are currently associated. Processing terminates at end block 270 with the result that a sufficient video memory amount has been provided to the graphic application.

Figure 7:
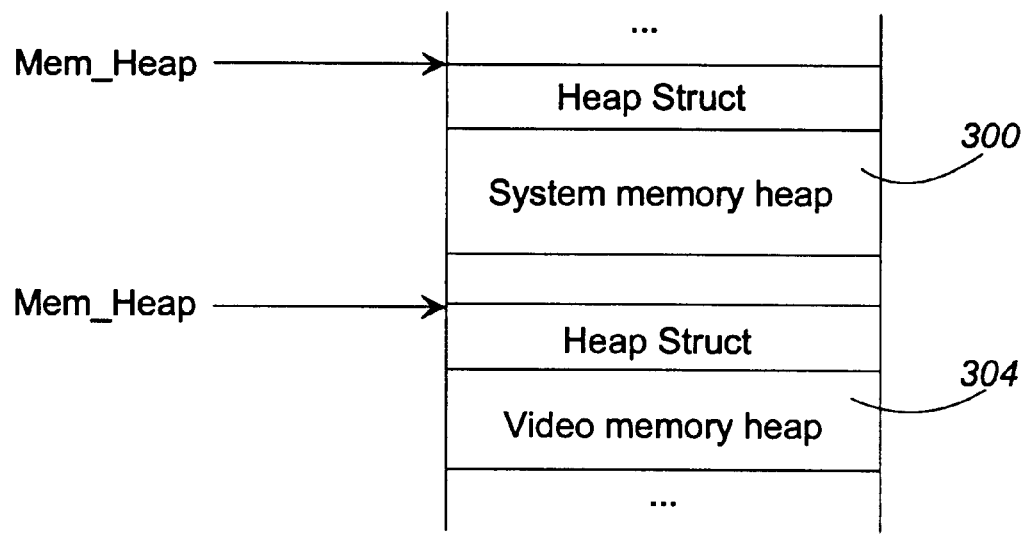
FIG. 7 is a memory organization diagram illustrating system and video memory portions.

FIGS. 7–10 describe the heap memory utilized in the preferred embodiment of the present invention. With reference to FIG. 7, memory manager enables a unified memory system comprised of two primary heaps: system memory heap 300 and video memory heap 304. Allocating memory from the video memory heap 304 ensures that whatever data is stored there is accessible to the video card and can, therefore, be displayed on the screen. Applications are given the opportunity to specify from which heap they wish to allocate memory. If they do not specify a preference, the operating system makes the decision for them.

Figure 8:
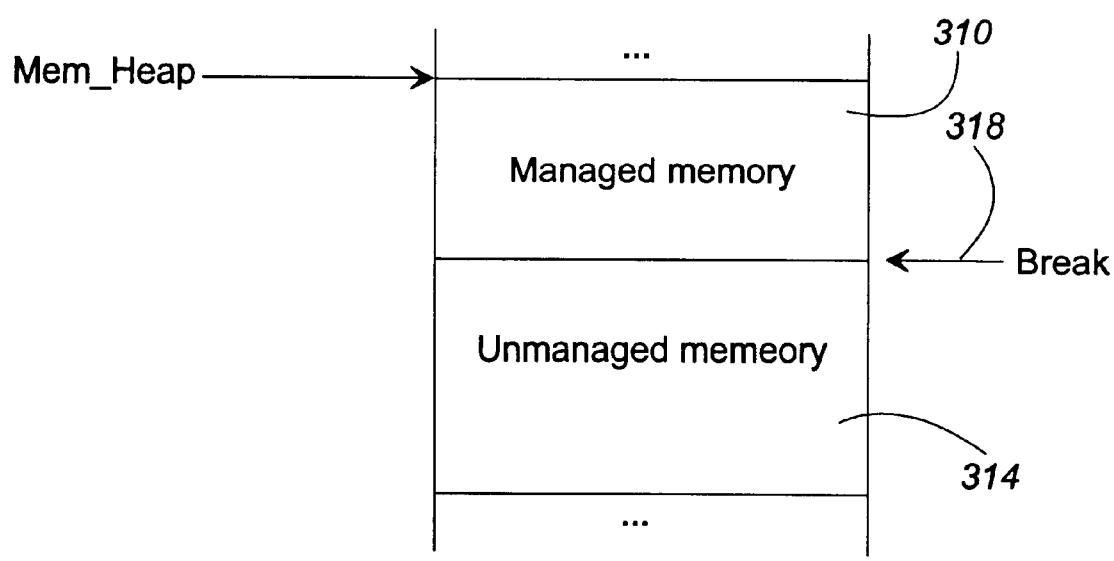
FIG. 8 is a memory organization diagram illustrating managed and unmanaged video memory portions.

With reference to FIG. 8, a heap contains both managed memory 310 and unmanaged memory 314. Managed memory 310 is memory that has been allocated. In contrast, unmanaged memory 314 is memory that has not been allocated. A heap's break 318 separates managed memory 310 from unmanaged memory 314.

Figure 9:
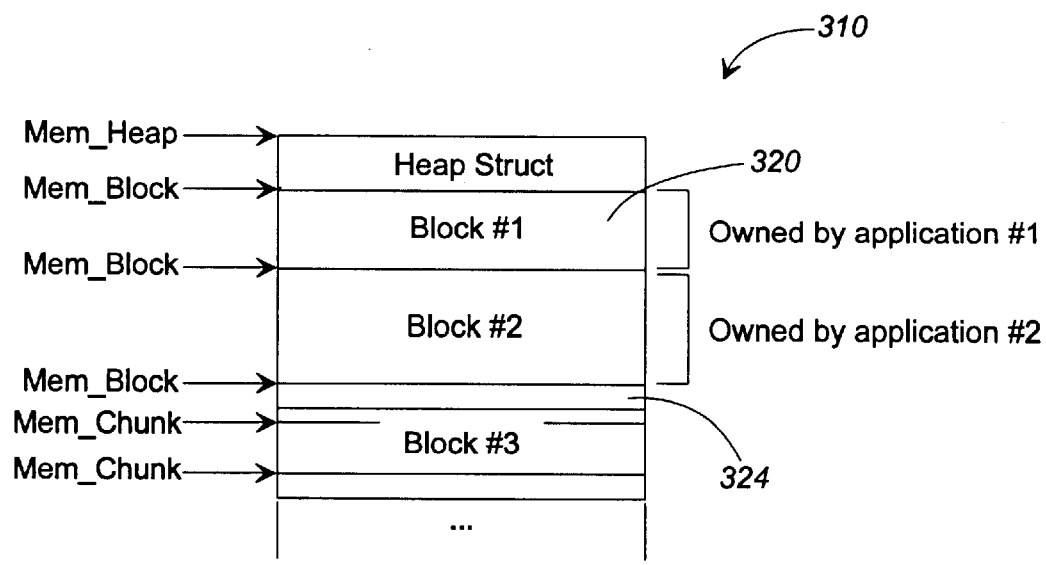
FIG. 9 is a memory organization diagram illustrating memory blocks and chunks.

With reference to FIG. 9, managed memory 310 is divided into blocks (e.g., block 320), and blocks into chunks (e.g., chunk 324). Each block, which consists of one or more contiguous chunks of memory, is owned by an application. For example, first application owns block 320.

The first time that an application allocates a pointer or handle, the system reserves a block of memory for that application from which it allocates the requested pointer or handle and from which it makes future allocations for that application. If an application allocates a very small (usually thirty-two bytes or less) amount of memory, that allocation is made from a small, fixed size block. Otherwise, blocks and chunks are not typically of a predetermined size.

In the preferred embodiment, memory manager supports memory management units (MMUs), which map an application's logically-contiguous memory addresses with real, physical memory addresses. The way in which a heap is organized enables memory manager to meet an MMUs' alignment requirements—which provide hardware enforcement of memory ownership—by ensuring that its blocks reside in those alignments.

Memory manager preferably does not own any heaps. Rather, the operating system creates the system and video memory heaps at initialization time by specifying the memory address that marks the start of the heap as well as the size. This function returns a pointer to the newly created heap.

Typically, applications do not create their own heaps which are called sub-heaps within the field of the present invention. Typically, applications allocate pointers and handles, referencing either of the heaps created by the system.

Figure 10:
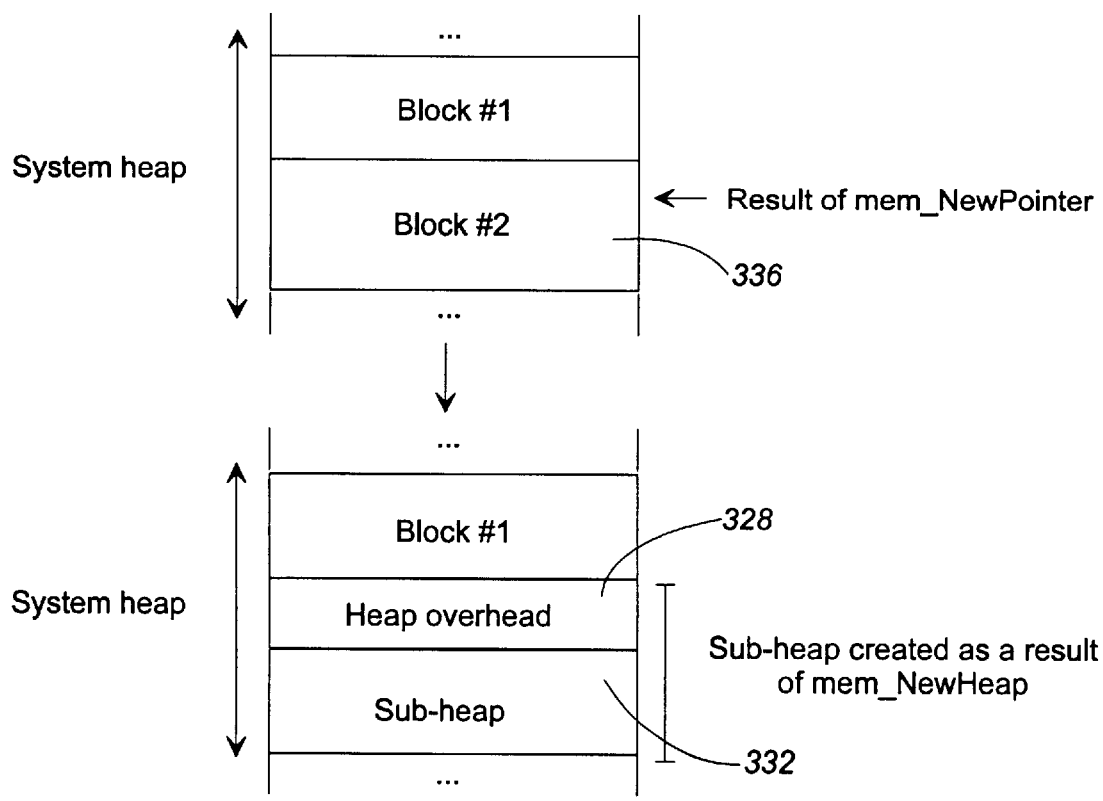
FIG. 10 is a memory organization diagram illustrating a creation of a sub-heap from a block of memory.

Sub-heaps reduces fragmentation as well as contention for memory among applications. Memory manager provides support for sub-heaps (and sub-heaps within sub-heaps), which are allocated from the system heap, owned by the applications that create them, and maintained by memory manager. For example, as shown in FIG. 10, memory manager creates heap overhead 328 and sub-heap 332 from block 336.

An application first allocates memory from the system heap in order for a sub-heap to be created by calling the memory manager. The memory manager returns a reference to the new sub-heap.

To delete a sub-heap, an application invokes memory manager to delete the heap and then to delete the pointer or the handle to the deleted heap. Memory manager then returns the portion of memory previously occupied by the sub-heap to the system or video heap from which it was allocated. Preferably, applications should not delete the system and video heaps.

The overhead required to maintain a heap (or a sub-heap) is allocated from the heap itself. This preferred approach signifies that the amount of allocateable heap space is equal to the size of the heap minus the overhead necessary to maintain the heap. The memory manager determines the amount of overhead necessary to maintain a heap of a specified size.

Memory manager is responsible for managing most, if not all, heaps, whether created by the system or by applications. Heap management involves keeping track of both the memory ranges that exist and any special attributes they might have.

The embodiments which have been set forth above were for the purpose of illustration and were not intended to limit the invention. It will be appreciated by those skilled in the art that various changes and modifications may be made to the embodiments discussed in this specification without departing from the spirit and scope of the invention as defined by the appended claims.

It is claimed:

1. A video memory handling system for providing a graphic computer-implemented process with a predetermined amount of video memory to be used by said graphic process to perform a predetermined graphic-related operation within a set-top box environment, comprising:

first video memory portion having an allocation status with respect to said graphic process;

a video memory data handling structure for indicating the allocation status of said first video memory portion;

a video memory manager connected to said video memory handling data structure for reallocating said first video memory portion based upon said video memory handling data structure, said video memory manager utilizing a memory allocation means to allocate video memory to said graphic process before reallocating said first memory portion;

wherein said memory allocation means is selected from the group comprising first fit means, best fit means, and combinations thereof; and said reallocated first video memory portion being utilized by said graphic process to perform said predetermined graphic-related operation.

2. The video memory handling system of claim 1 wherein said video memory handling data structure includes a handle associated with said first memory portion, said handle being utilized by said video memory manager to reallocate said first video memory portion.

3. The video memory handling system of claim 1 wherein a first graphic computer-implemented process requires a predetermined amount of video memory to perform a predetermined graphic-related operation, wherein a second graphic computer-implemented process requires a predetermined amount of video memory to perform a predetermined graphic-related operation;

said video memory handling data structure including a first purge priority associated with said first video memory allocation, said video memory manager purging said first video memory allocation based upon said first purge priority, said first video memory being reallocated to said second process.

4. The video memory handling system of claim 3 wherein said memory manager utilizes a memory allocation fit means to allocate video memory to said graphic process before reallocating said first memory portion.

5. The video memory handling system 8 claim 1 further comprising:

a video memory sufficiency determinator for determining whether sufficient video memory is available to said graphic process to perform said graphic-related operation, said memory manager being connected to said video memory sufficiency determinator for reallocating said first video memory portion if said video memory sufficiency determinator determines that insufficient video memory exists after said memory manager utilizes said memory allocation fit means.

6. The video memory handling system of claim 5 wherein said set-top box includes a foreground on-screen display, said foreground on-screen display being disabled if said video memory sufficiency determinator determines that insufficient video memory exists after said memory manager has reallocated said first video memory portion.

7. The video memory handling system of claim 5 wherein said set-top box includes a frame buffer, said frame buffer being unlocked if said video memory sufficiency determinator determines that insufficient video memory exists after said memory manager has reallocated said first video memory portion.

8. The video memory handling system of claim 5 wherein said memory manager sends an event to applications operating within said set-top box in order to provide a request to said applications to free up video memory which has been allocated to said applications, said memory manager providing said request when said video memory sufficiency determinator determines that insufficient video memory exists after said memory manager has reallocated said first video memory portion.

9. The video memory handling system of claim 1 wherein said video memory handling data structure includes a lock field for indicating when said graphic process is performing said predetermined graphic-related operation.

10. The video memory handling system of claim 1 wherein a first and second graphic computer-implemented process are to respectively perform first and second predetermined graphic-related operations, said first and second process using a third video memory portion to perform their respective graphic-related operations, said video memory handling data structure including a lock count for indicating when said first and second graphic processes are performing said respective first and second graphic-related operations.

11. The video memory handling system of claim 10 wherein said video memory manager increments said lock count when said first graphic process is performing its respective graphic-related operation, said video memory manager incrementing said lock count when said second graphic process is performing its respective graphic-related operation.

12. The video memory handling system of claim 11 wherein said video memory manager decrements said lock count when said first graphic process has completed its respective graphic-related operation, said video memory manager decrementing said lock count when said second graphic process has completed its respective graphic-related operation.

13. A video memory handling method for providing a graphic computer-implemented process to perform a predetermined amount of video memory to be used by said graphic process to perform a predetermined graphic-related operation within a set-top box environment, said set-top box having a central processing unit and a graphic processor, comprising the steps of:

providing a first heap for use by said central processing unit (CPU);

providing a second heap for use by said graphic processor;

providing a first video memory portion within said second heap having an allocation status with respect to said graphic process;

providing a video memory handling data structure for indicating the allocation status of said first video memory portion;

providing a video memory manager connected to said video memory handling data structure for reallocating said first video memory portion based upon said video memory handling data structure;

said reallocated first video memory portion being utilized by said graphic process to perform said predetermined graphic-related operation;

performing first and second predetermined graphic-related operations using a third video memory portion; and providing a lock field within said video memory data handling structure for indicating when said first and second graphic operations are being performed and when said first and second graphic operations have been completed.

14. The method of claim 13 further comprising the steps of:

providing a handle within said video memory handling data structure;

associating said handle with said first video memory portion;

reallocating said first video memory portion via said handle so that said first memory portion is usable by said first video memory portion.

15. The method of claim 13 wherein a first graphic computer-implemented process requires a predetermined amount of video memory to perform a predetermined graphic-related operation, further comprising the steps of:

allocating a second graphic computer-implemented process to a second video memory portion via said video memory handling data structure so as to produce a first video memory allocation;

providing a first purge priority within said video memory handling data structure;

associating said first purge priority with said first video memory allocation;

purging said first video memory allocation based upon said first purge priority: and reallocating said first video memory portion to said second process.

16. The method of claim 15 further comprising the steps:

allocating a third graphic computer-implemented process to a fourth memory portion via said video memory handling data structure so as to produce a second video memory allocation;

providing a second purge priority within said video memory handling data structure;

associating said second purge priority with said second video memory allocation, said first and second purge priorities having levels which are indicative of the degree of priority;

purging said first video memory allocation based upon said first purge priority being of a lower priority than said second purge priority; and reallocating said first video memory to said second process.

17. The method of claim 13 further comprising the step of:

allocating via a memory allocation fit mechanism video memory to said graphic process before reallocating said first memory portion.

18. The method of claim 17 wherein said predetermined memory allocation mechanism is selected from the group consisting of first fit means, best fit means and combinations thereof.

19. The method of claim 17 further comprising the steps of:
- determining whether sufficient video memory is available to said graphic process to perform said graphic-related operation; and
- reallocating said first video memory portion if said video memory sufficiency determinator determines that insufficient video memory exists after said memory manager utilizes said memory allocation fit means.

20. The method of claim 19 wherein said set-top box includes a frame buffer, said method further comprising the step of:
- unlocking said frame buffer if insufficient video memory exists after reallocating said first video memory portion.

21. The method of claim 19 further comprising the step of:
- sending an event to applications operating within said set-top box in order to request said applications to free up video memory which has been allocated to said applications, said event being sent if insufficient video memory exists after reallocating said first video memory portion.

22. The method of claim 17 wherein said set-top box includes a foreground on-screen display, said method further comprising the step of:
- disabling said foreground on-screen display if insufficient video memory exists after reallocating said first video memory portion.

23. The method of claim 13 further comprising the step of:
- providing a lock field within said video memory handling data structure for indicating when said graphic process is performing said predetermined graphic-related operation.

24. The method of claim 13 further comprising the steps of:
- incrementing said lock count when said first graphic operation is being performed; and
- incrementing said lock count when said second graphic operation is being performed.

25. The method of claim 24 further comprising the steps of:
- decrementing said lock count when said first graphic operation has completed; and
- decrementing said lock count when said second graphic-related operation has completed.

* * * * *

UNITED STATES PATENT AND TRADEMARK OFFICE
CERTIFICATE OF CORRECTION

PATENT NO. : 6,300,962 B1
DATED : October 9, 2001
INVENTOR(S) : Wishoff et al.

It is certified that error appears in the above-identified patent and that said Letters Patent is hereby corrected as shown below:

<u>Column 8,</u>
Line 56, delete "8 claim 1" and insert therefore -- of claim 1 --

Signed and Sealed this

Fourth Day of June, 2002

Attest:

Attesting Officer

JAMES E. ROGAN
*Director of the United States Patent and Trademark Office*